United States Patent Office

2,938,869
Patented May 31, 1960

2,938,869

LUBRICANTS CONTAINING NITROGENOUS THIOMOLYBDATES

Georges Hugel, Paris, France, assignor to Institut Francais du Petrole des Carburants et Lubrifiants, Paris, France No Drawing. Filed May 7, 1956, Ser. No. 582,924

9 Claims. (Cl. 252—46.4)

The present application is a continuation-in-part of application Serial No. 480,611, filed January 7, 1955, now U.S. Patent No. 2,909,541.

The present invention relates to lubricants containing nitrogenous thiomolybdates and the use thereof in the lubrication of metals.

A primary object of the present invention is the embodiment of lubricants containing in solution a sulfur compound of molybdenum which is decomposable, under the influence of the heat liberated by friction between parts in contact, to provide a deposit which fills the irregularities of the said surfaces and protects them against wear, considerably reducing their coefficient of friction. The thiomolybdates of organic bases fulfill these requirements.

The only thiomolybdates of organic bases heretofore prepared have been the thiomolybdates of piperazine and piperidine. These products were prepared by Debucquet and Velluz (Bulletin de la Ste Chimique de France, 1932, 51, 1571) by dissolving molybdic acid in an aqueous solution of the base, and then passing a stream of hydrogen sulfide into such solution for 12 to 24 hours. The thiomolybdate was obtained in the form of brick-red crystals, by filtering the solution.

The aforesaid copending application discloses and claims the new nitrogen-containing thiomolybdates used according to this invention, as well as the preparation of such thiomolybdates. The process of preparation according to the said application is not only more rapid and more economical than the aforesaid prior process, but it also makes it possible to prepare the thiomolybdate of any nitrogen base whatever, thus giving rise to an entire new series of compounds, which are of considerable interest wherever it is desired to produce an insoluble sulfur compound of molybdenum by the thermal decomposition of a solution of a thiomolybdate, and especially in the lubricants field.

The preparation of the thiomolybdates of nitrogen bases is achieved, according to the said copending application, either by admixing aqueous solutions of sodium thiomolybdates and hydrochlorides, sulfates, hydrobromides or other soluble salts of organic bases, or by incorporating the salt of the organic base in the solid state in the thiomolybdate solution in very slight excess over the theoretical quantity. The reaction takes place very rapidly. The thiomolybdates appear in the form of crystals, generally of brick-red color, with the color varying somewhat with the nature of the base. The yields are practically quantitative.

The use for lubrication purposes of the thiomolybdates of piperazine and piperidine, the only prior known compounds of this class, has never before been envisaged. The present invention is directed particularly to the utilization of all thiomolybdates of nitrogen bases as lubricant dopes.

The following examples set forth representative embodiments of the process of preparing thiomolybdates useful for the purposes of the present invention. In these examples, the percentages are by weight.

EXAMPLE 1

There are successively prepared a normal solution of sodium thiomolybdate (one mol) in one liter of water and an aqueous four-normal solution of triethylamine hydrochloride (two mols) in one liter of water. One part by volume of the triethylamine hydrochloride solution is poured in two parts by volume of the solution of the thiomolybdate. There is thus obtained a precipitate of triethylamine thiomolybdate in the form of crystals of brick-red color.

Analysis by calcination of the organic product leaves a residue of $MoO_3$ corresponding to 33.7% of the molybdate formed. The percentage of $MoO_3$ calculated from the formula $[N(C_2H_5)_3]_2 \cdot H_2MoS_4$ is 33.8% which is extremely close to that actually obtained.

EXAMPLE 2

Heptylamine thiomolybdate is prepared in the form of brown-red crystals of double exchange between sodium thiomolybdate (1 mol) and heptylamine hydrochloride (2 mols), after the manner described in Example 1.

Analysis by calcination of the organic product leaves a residue of $MoO_3$ corresponding to 31.5% of the thiomolybdate formed. The percentage of $MoO_3$ calculated from the formula $(NH_2C_7H_{15})_2 \cdot H_2MoS_4$ is 31.7% which is extremely close to that actually obtained.

EXAMPLE 3

Methylpyridinium thiomolybdate is prepared in the form of red crystals by precipitation from a solution of sodium thiomolybdate (1 mol) with the theoretical quantity (2 mols) of methylpyridinium sulfate, after the manner described in Example 1.

Analysis by calcination of the organic product leaves a residue to $MoO_3$ corresponding to 34.9% of the thiomolybdate formed. The percentage of $MoO_3$ calculated from the formula $(C_6H_8N)_2MoS_4$ is 35.0% which is extremely close to that actually obtained.

EXAMPLE 4

Hexylpyridinium thiomolybdate is prepared in the form of red crystals by double exchange between hexylpyridinium hydrobromide (2 mols) and sodium thiomolybdate (1 mol), after the manner described in Example 1.

Analysis by calcination of the organic product leaves a residue of $MoO_3$ corresponding to 28.3% of the thiomolybdate formed. The percentage of $MoO_3$ calculated from the formula $(C_{11}H_{18}N)_2MoS_4$ is 26.1%, which is very close to that actually obtained.

EXAMPLE 5

Decylene-1,10-dipyridinium thiomolybdate is prepared in the form of red crystals by double exchange between decylene-1,10 dipyridinium hydrobromide (2 mols) and sodium thiomolybdate (1 mol), after the manner described in Example 1.

Analysis by calcination of the organic product leaves a residue of $MoO_3$ corresponding to 26.3% of the thiomolybdate formed. The percentage of $MoO_3$ calculated from the formula $(C_{20}H_{30}N)_2MoS_4$ is 27.6% which is very close to that actually obtained.

EXAMPLE 6

Hexyl-quinolinium thiomolybdate is obtained in the form of red crystals by double exchange between sodium molybdate (1 mol) and hexyl-quinolinium hydrobromide (2 mols), after the manner described in Example 1.

Analysis by calcination of the organic product leaves a residue of $MoO_3$ corresponding to 23.0% of the thiomolybdate formed. The percentage of $MoO_3$ calculated from the formula $(C_{15}H_{20}N)_2MoS_4$ is 23.1% which is extremely close to that actually obtained.

EXAMPLE 7

By precipitation of an aqueous solution of sodium thiomolybdate (1 mol) with an aqueous solution of decylamine hydrochloride (2 mols), the decylamine thiomolybdate is obtained in the form of a very luminous orange-colored powder.

After calcination to a dull red heat, a residue of $MoO_3$ remains which corresponds to 27.3% of the thiomolybdate formed. The theoretical figure for such $MoO_3$ residue, calculated from the formula $$(NH_2C_{10}H_{21}).H_2MoS_4$$

is 26.77%.

It will be understood that the invention covers application to thiomolybdates of other organic nitrogen bases than those mentioned, by way of example in the foregoing illustrative examples. Thus other operative thiomolybdates comprise:

Octylamine thiomolybdate,
Dodecylamine thiomolybdate,
Tetradecylamine thiomolybdate,
Hexadecylamine thiomolybdate,
Octadecylamine thiomolybdate,
Octadecenylamine thiomolybdate,
Octadecadienylamine thiomolybdate,
Alkyltrimethyl ammonium thiomolybdate,
Dialkyl dimethyl ammonium thiomolybdate,
N-methyloctylamine thiomolybdate,
N-methyldodecylamine thiomolybdate,
N-methylhexadecylamine thiomolybdate,
N-methyldodecylamine thiomolybdate,
N-methyl dihexadecylamine thiomolybdate,
N,N-dimethyl octylamine thiomolybdate,
N,N-dimethyl dodecylamine thiomolybdate,
N,N-dimethyl hexadecylamine thiomolybdate,
N,N-diethyl dodecylamine thiomolybdate,
N,N-diethyl hexadecylamine thiomolybdate,
N-alkyl pyridinium thiomolybdate,
N-alkyl picolinium thiomolybdate,
N-alkyl lutidinium thiomolybdate,
N-alkyl isoquinolinium thiomolybdate,
N-alkyl methylquinolinium thiomolybdate, etc.

Coming now, more specifically, to the lubricants and lubricant-use aspects of the present invention:

The thiomolybdates of organic bases are but little soluble in water and in alcohol, solutions in the latter being of yellow orange color. On the other hand, the said thiomolybdates are soluble in vegetable or animal oils or in oils constituted by a mixture of esters of fatty acids and alcohols, or in a mixture obtained from trans-esterification of vegetable or animal oils with polyethylene glycol or polypropylene glycol or a higher alcohol, or in the synthetic products from the esterification of mono and polyalcohols with fatty acids or from the esterification of diacids with monoalcohols. Particularly valuable are a solution of a nitrogenous thiomolybdate in a diol, glycol, polyalcohol or polyethyleneglycol. The lubricants thus obtained have the property of decomposing at temperature and pressures produced by friction.

Among others the following specific oils can be used as lubricants according to the invention: castor oil, peanut oil, olive oil, ox-foot oil, fish oil, monooleates of polyethylene glycols, monooleates of butylene glycols, monooleates of polypropylene glycols, monooleates of polytrimethylene glycols, palmitates of polypropylene glycols, dioleates of: polyethylene glycols, butylene glycol, polypropylene glycols, polytrimethylene glycols; bishexyl sebacate, bishexyl adipate, bishexyl methyl adipate, bisheptyl sebacate, bisheptyl adipate, bisheptylmethyl adipate, bisoctyl sebacate, bisoctyl adipate, bisoctyl methyl adipate, bisnonyl sebacate, bisnonyl adipate, bisnonyl methyl adipate, bisdecyl adipate, bisdecyl sebacate, bisdecyl methyl adipate, bisundecyl sebacate, bisundecyl adipate, bisundecyl methyl adipate, bisdodecyl sebacate, bisdodecyl adipate, bisdodecyl methyl adipate, decane diol, octane diol, hexane diol.

The solution of the organic thiomolybdates of the present invention in these oils can be established at various concentrations. As a rule, the higher the concentration of the organic thiomolybdates in the oils, the more intense is the lubricating power of the resultant product. On the other hand, experience has shown that very small concentrations of the order of 0.2% bring about a notable increase in the lubricating power of the thus-established oil. In view of the high cost of the thiomolybdates, there is a limit, economically, to their concentration in the base oil, which limit is about 6% (on the basis of present economic conditions). According to the base oil employed and the lubricating performances which it is desired to achieve, it is presently preferred to incorporate into the oil a quantity of thiomolybdate of organic base representing about 0.2 to 6% by weight of such oil. Higher percentages may of course also be employed, if desired.

The solutions thus prepared are stable in air, but possess the property of decomposing at high temperature (above about 110° C.), depositing a brown-colored sulfur compound of molybdenum. This deposit fills the irregularities of the contact surfaces of the members being subjected to friction; it thus facilitates the sliding thereof, considerably reducing their coefficient of friction and their wear. The numerous advantages which result from the utilization of these solutions in the field of lubrication are thus clear.

Thus, for example, a 2% solution of the thiomolybdate of triethylamine in a polyethylene glycol of a molecular weight of 400 constitutes a lubricant of the first order. Tests carried out on the "Four-Ball Machine," described by Boerlage in "Engineering," July 14, 1933, page 46, show that such lubricant makes it possible to attain directly pressures at 180 kg. (26,000 kg./cm.$^2$ taking into account the deformation of the diameter) without seizure of the machine, while the same polyethylene glycol used alone as lubricant without the addition of the thiomolybdate allows the attainment of only a pressure of 110 kg. (1300 kg./cm.$^2$) with seizure occurring after 3.5 seconds. The principal results of these tests are tabulated in the following:

Tests on the "Four-Ball Machine"

A. POLYETHYLENE GLYCOL OF MOLECULAR WEIGHT 400 (ALONE)

| Load Applied in kg. | Time Until Seizing Begins in Seconds | Duration of Seizing in Seconds | Coefficient of Friction | | |
|---|---|---|---|---|---|
| | | | Before Seizing | Maximum | After Seizing |
| 80 | 13 | 3 | 0.08 | 0.35 | 0.06 |
| 100 | 6 | 4 | 0.08 | 0.42 | 0.06 |
| 110 | 3.5 | 4.5 | 0.09 | 0.49 | 0.07 |

B. POLYETHYLENE GLYCOL OF MOLECULAR WEIGHT 400+2% OF TRIETHYLAMINE THIOMOLYBDATE

| | | | | | |
|---|---|---|---|---|---|
| 170 | 3.5 | 0.5 | 0.09 | 0.11 | 0.06 |
| 180 | 2.0 | 2.5 | 0.08 | 0.10 | 0.06 |
| 190 | 0.2 | 2.8 | 0.09 | 0.16 | 0.06 |

Note.—These tests were carried out using new balls each time.

The difference in performance is even more distinct when the pressure is increased progressively while lubricating continuously. The protective deposit formed by decomposition of the thiomolybdate under the influence of the temperature attained locally by the friction then becomes increasingly greater and makes it possible to obtain pressures on the "Four-Ball Machine" exceeding 300 kg. without seizure.

Following is another representative set of test results on the "Four-Ball Machine." In these tests, the thiomolybdates of nitrogen bases being tested were employed in solution in a polyethylene glycol of a molecular weight of 400.

The results which follow set forth, as a function of the applied load (in kilos), the time until seizing begins (in seconds), the coefficients of friction before seizing, maximum, and after seizing, and also the diameter of the imprint (in millimeters).

*Tests on the "Four-Ball Machine"*

C. SOLUTION OF 1% OCTYLAMINE THIOMOLYBDATE IN POLYETHYLENE GLYCOL OF MOLECULAR WEIGHT 400

| Load applied (kg.) | 260 | 290 | 300 | 310 |
|---|---|---|---|---|
| Time Until Seizing Begins (Seconds) | >60 | >60 | 0.4 | 0 |
| Coefficient of Friction: | | | | |
| Before Seizing | 0.11 | 0.10 | 0.10 | 0.10 |
| Maximum | | | 0.15 | 0.24 |
| After Seizing | | | 0.06 | 0.06 |
| Diameter of Imprint (mm.) | 0.6 | 0.6 | 1.0 | 1.2 |

D. SOLUTION OF 1% DECYLAMINE THIOMOLYBDATE IN POLYETHYLENE GLYCOL OF MOLECULAR WEIGHT 400

| Load applied (kg.) | 260 | 280 | 285 | 290 | 300 |
|---|---|---|---|---|---|
| Time Until Seizing Begins (Seconds) | >60 | >60 | 0 | 0.2 | 0 |
| Coefficient of Friction: | | | | | |
| Before Seizing | 0.10 | 0.9 | | | |
| Maximum | | | 0.26 | 0.24 | 0.29 |
| After Seizing | | | 0.07 | 0.06 | 0.05 |
| Diameter of Imprint (mm.) | 0.65 | 0.60 | 1.20 | 1.20 | 1.40 |

E. SOLUTION OF 0.6% OF METHYLPYRIDINIUM THIOMOLYBDATE IN POLYETHYLENE GLYCOL OF MOLECULAR WEIGHT 400

| Load applied (kg.) | 260 | 265 | 270 | 280 |
|---|---|---|---|---|
| Time Until Seizing Begins (Seconds) | >60 | 0.2 | 0 | 0 |
| Coefficient of Friction: | | | | |
| Before Seizing | 0.10 | 0.12 | | |
| Maximum | | 0.22 | 0.26 | 0.27 |
| After Seizing | | 0.06 | 0.06 | 0.07 |
| Diameter of Imprint (mm.) | 0.6 | 1.1 | 1.2 | 1.2 |

F. SOLUTION OF 0.5% OF HEXYLPYRIDINIUM THIOMOLYBDATE IN POLYETHYLENE GLYCOL OF MOLECULAR WEIGHT 400

| Load applied (kg.) | 260 | 280 | 290 | 295 | 300 |
|---|---|---|---|---|---|
| Time Until Seizing Begins (Seconds) | >60 | >60 | >60 | 0 | 0 |
| Coefficient of Friction: | | | | | |
| Before Seizing | 0.11 | 0.11 | 0.10 | | |
| Maximum | | | | 0.29 | 0.36 |
| After Seizing | | | | 0.06 | 0.08 |
| Diameter of Imprint (mm.) | 0.7 | 0.6 | 0.7 | 1.6 | 1.6 |

G. BIS-RICINOLEATE OF POLYETHYLENE GLYCOL OF MOLECULAR WEIGHT 400

| Load applied (Kg.) | 110 | 115 | 120 |
|---|---|---|---|
| Time Until Seizing Begins | >60 | >60 | 1 |
| Coefficient of Friction: | | | |
| Before Seizing | 0.08 | 0.10 | 0.11 |
| Maximum | | | 0.64 |
| After Seizing | | | 0.08 |
| Diameter of Imprint (mm.) | 0.4 | 0.6 | 0.8 |

H. SOLUTION OF 1% OF OCTYLAMINE THIOMOLYBDATE IN BIS-RICINOLEATE OF POLYETHYLENE GLYCOL OF MOLECULAR WEIGHT 400

| Load applied (Kg.) | 140 | 160 | 170 | 175 | 180 |
|---|---|---|---|---|---|
| Time Until Seizing Begins | >60 | >60 | >60 | 0.6 | 0.2 |
| Coefficient of Friction: | | | | | |
| Before Seizing | 0.12 | 0.12 | 0.12 | 0.11 | 0.12 |
| Maximum | | | | 0.29 | 0.27 |
| After Seizing | | | | 0.07 | 0.07 |
| Diameter of Imprint (mm.) | 0.5 | 0.7 | 0.7 | 1.2 | 1.2 |

Tests carried out on the Faville Machine (Ryal, First Spring Meeting of the American Society of Lubricating Engineers, Chicago, April 5/6, 1946) are representatively set forth in the following tabular summary. The object of these tests is primarily to show the jamming load (in kilos), in function of the tension applied, of the lubricant. Use was made in each case of a lubricant constituted by polyethylene glycol with a molecular weight of 400, to which was added sufficient additive to just saturate the solution. The results follow:

1. POLYETHYLENE GLYCOL 400 SATURATED WITH THIOMOLYBDATE OF TRIETHYLAMINE (2%)

| Tension applied, volts | Load, kilos | Couple |
|---|---|---|
| 80 | 450 | |
| 100 | 700 | 0.08 |
| 120 | 1,650 | [1] 0.22 |
| 140 | 1,800 | 0.34 |

[1] Wear: 0.06 mm.

2. POLYETHYLENE GLYCOL 400 SATURATED WITH HEXYLQUINOLINIUM THIOMOLYBDATE (0.25%)

| Tension applied, volts | Load, kilos | Couple |
|---|---|---|
| 80 | 525 | |
| 100 | 1,250 | 0.08 |
| 120 | 1,625 | [1] 0.14 |
| 140 | 1,975 | 0.1 |

[1] Wear: 0.15 mm.

It will be evident from the foregoing that the invention is particularly applicable to the lubrication of metal parts of machines and the like.

Having thus disclosed the invention, what is claimed is:

1. A lubricant composition consisting essentially of from 94 to 99.8 parts by weight of a lubricant base selected from the group consisting of vegetable oil, animal oil, alkanediols having from 6 to 10 carbon atoms, fatty acid esters wherein the fatty acid radical has from 6 to 18 carbon atoms and the alcohol part of the ester consists of from one to two radicals of an alcohol having from one to two hydroxyl groups and from 4 to 12 carbon atoms, and monobasic fatty acid alkanediol esters wherein the fatty acid radical has from 16 to 18 carbon atoms and wherein the alcohol part of the ester is a polyalkylene glycol radical wherein the alkylene group contains from 2 to 5 carbon atoms, and, dissolved therein, from 0.2 to 6 parts by weight of a thiomolybdate of an organic nitrogen base.

2. A lubricant composition consisting essentially of from 94 to 99.8 parts by weight of a vegetable oil and, dissolved therein, from 0.2 to 6 parts by weight of a thiomolybdate of an organic nitrogen base.

3. A lubricant composition consisting essentially of from 94 to 99.8 parts by weight of an animal oil and, dissolved therein, from 0.2 to 6 parts by weight of a thiomolybdate of an organic nitrogen base.

4. A lubricant composition consisting essentially of from 94 to 99.8 parts by weight of a lubricant base consisting of an alkanediol having from 6 to 10 carbon atoms, and, dissolved therein, from 0.2 to 6 parts by weight of a thiomolybdate of an organic nitrogen base.

5. A lubricant composition consisting essentially of from 94 to 99.8 parts by weight of a lubricant base consisting of a fatty acid ester wherein the fatty acid radical has from 6 to 18 carbon atoms and the alcohol part of the ester consists of from one to two radicals of an alcohol having from one to two hydroxyl groups and from 4 to 12 carbon atoms, and, dissolved therein, from 0.2 to 6 parts by weight of a thiomolybdate of an organic nitrogen base.

6. A lubricant composition consisting essentially of from 94 to 99.8 parts by weight of a monobasic fatty acid alkanediol ester, wherein the fatty acid radical has from 16 to 18 carbon atoms and the alcohol part of the ester is a polyethylene glycol, and, dissolved therein, from 0.2 to 6 parts by weight of a thiomolybdate of an organic nitrogen base.

7. A lubricant composition consisting essentially of from 94 to 99.8 parts by weight of a monobasic fatty acid alkanediol ester, wherein the fatty acid radical has from 16 to 18 carbon atoms and the alcohol part of the ester is a polypropylene glycol radical, and, dissolved therein, from 0.2 to 6 parts by weight of a thiomolybdate of an organic nitrogen base.

8. A lubricant composition consisting essentially of from 94 to 99.8 parts by weight of a dibasic fatty acid alkyl ester wherein the fatty acid radical has from 6 to 10 carbon atoms and the alkyl part of the ester has from 6 to 12 carbon atoms, and, dissolved therein, from 0.2 to 6 parts by weight of a thiomolybdate of an organic nitrogen base.

9. A lubricant composition consisting essentially of from 94 to 99.8 parts by weight of a monooleate of a polyethylene glycol, and, dissolved therein, from 0.2 to 6 parts by weight of a thiomolybdate of an organic nitrogen base.

References Cited in the file of this patent
UNITED STATES PATENTS
2,421,543    Cook _____ June 3, 1947

OTHER REFERENCES
Debucquet et al., Bulletin de la Ste' Chemique de France, 1932, 51, 1571.